United States Patent
Rabinovitch et al.

(10) Patent No.: US 8,095,981 B2
(45) Date of Patent: Jan. 10, 2012

(54) WORM DETECTION BY TRENDING FAN OUT

(75) Inventors: Peter Rabinovitch, Kanata (CA); Stanley TaiHai Chow, Ottawa (CA); Bassem Abdel-Aziz, Kanata (CA)

(73) Assignee: Alcatel Lucent, Paris (FR)

( * ) Notice: Subject to any disclaimer, the term of this patent is extended or adjusted under 35 U.S.C. 154(b) by 991 days.

(21) Appl. No.: 11/785,655

(22) Filed: Apr. 19, 2007

(65) Prior Publication Data
US 2008/0178291 A1 Jul. 24, 2008

Related U.S. Application Data

(63) Continuation-in-part of application No. 11/656,434, filed on Jan. 23, 2007.

(51) Int. Cl.
*G06F 21/00* (2006.01)
(52) U.S. Cl. .......................... 726/23; 713/188
(58) Field of Classification Search ........................ None
See application file for complete search history.

(56) References Cited

U.S. PATENT DOCUMENTS

| | | | |
|---|---|---|---|
| 7,624,447 B1 * | 11/2009 | Horowitz et al. | 726/23 |
| 7,712,134 B1 * | 5/2010 | Nucci et al. | 726/23 |
| 7,823,202 B1 * | 10/2010 | Nucci et al. | 726/22 |
| 2001/0005883 A1 * | 6/2001 | Wray et al. | 713/151 |
| 2004/0054925 A1 * | 3/2004 | Etheridge et al. | 713/201 |
| 2004/0187023 A1 * | 9/2004 | Alagna et al. | 713/200 |
| 2006/0287607 A1 * | 12/2006 | Sackellares et al. | 600/544 |
| 2007/0237080 A1 * | 10/2007 | Savagaonkar | 370/235 |
| 2009/0044276 A1 | 2/2009 | Abdel-Aziz et al. | |

OTHER PUBLICATIONS

Sekar, Vyas, et, al., A Multi-Resolution Approach for Worm Detection and Containment, International Conference on Dependable Systems and Networks, 2006.
Estan, Cristian, et, al., Bitmap Algorithms for Counting Active Flows on High Speed Link, XP-002523818 Oct. 27-29, 2003, Miami Beach, Florida.
Yang, Xiong et, al., Simulation and Evaluation of a New Algorithm of Worm Detection and Containment, 2006.
Pele, Li et, al., A Survey of Internet Worm Detection and Containment, IEEE Communications Surveys & Tutorials, 2008, vol. 10, No. 1.

* cited by examiner

*Primary Examiner* — Gilberto Barron, Jr.
*Assistant Examiner* — Simon Kanaan
(74) *Attorney, Agent, or Firm* — Kramer & Amado P.C.

(57) ABSTRACT

The invention detects stealth worm propagation by comparing the repeat elements in sets of destinations of a source in multiple time windows to a fitted distribution of same, stored as a benchmark plot. Measurements are performed over N time windows, wherein a representation of the set of destinations to which a respective source has sent packets is determined for each source, in each time window. The counting is performed using a hash table. Once N such sets of destinations have been obtained, the number $X_k$ of destinations that are common to N, N−1, N−2, . . . , 2, 1 windows is determined. Thus $X_k$ is the number of destinations that a particular source sent packets to in k time windows. $X_k$ is then compared to the corresponding value on the plot; anomalies indicate an attack from the respective source.

20 Claims, 2 Drawing Sheets

WORM DETECTION BY TRENDING FAN OUT

RELATED PATENT APPLICATIONS

This patent application is a continuation in part of the U.S. patent application Ser. No. 11/656,434 (Chow et al.) entitled: "A Containment Mechanism For Potentially Contaminated End Systems", filed on Jan. 23, 2007 and assigned to Alcatel. The content of this application is incorporated herein by reference.

FIELD OF THE INVENTION

The invention is directed to communication networks and in particular to worm detection by assessing the trend of the fan-out traffic at a node.

BACKGROUND OF THE INVENTION

The reliability and security of an IP network is essential in a world where computer networks are a key element in intra-entity and inter-entity communications and transactions. While the current network security systems have been around for years, to date none have been able to deliver on the final goal of providing full protection against all malicious attacks with little associated cost and annoyance.

Providing a security solution requires an understanding of possible threat scenarios and their related requirements. There are many types of security concerns that must be considered in a network, among which, the network worms are regarded as a growing threat. Lately, large scale worms spread all over the Web, producing serious damages both to the network/service providers and users. Attacks on network security increased tenfold between 1993 and 2003, from 1,334 to 137,529 (CERT Coordination Center). Furthermore, 20-40 new or variant virus threats were reported daily to TrendMicro in 2003. The number of attacks between January and June, 2003 exceeded 70,000, which is the double of those of the previous year (Reuters). Viruses cost businesses around the world $55 billion in 2003, up from $13 billion in 2001 (TrendMicro).

A worm is a self propagating program that resides in the memory of the attacked system and duplicates itself, without altering the resident applications and files, but using parts of the operating system. It is common for worms to be noticed only when their uncontrolled replication consumes system resources, slowing or halting other applications. By hijacking trusted applications such as web servers, mail transfer agents and log-in servers, which typically run with elevated privileges, worms can gain full access to system resources, and cause a complete system compromise. Even though the impact of a single worm on any given piece of network equipment can be benign, the cumulative effects of tens of thousands of infected network devices spreading the malware to other devices connected to the network can be disastrous.

Network security is one of the biggest challenges of the Internet, due to Internet's unrestricted connectivity, openness, and widespread software homogeneity. Infected hosts with high bandwidth network connections can initiate thousands of connections requests/second, each of which has the potential to spread the infection. Worm detection must be performed quickly to recognize and identify the attacker. Also, antivirus systems are of little use if they fail to be triggered quickly after a host is infected.

Furthermore, many security experts believe that the newer communications channels, such as instant messaging (IM) and VoIP, pose a very serious threat to networks. According to Gartner Group research, 58% of network security managers stated that instant messaging poses the most dangerous security risk to their enterprise. Symantec Security Response predicts that the next major worm exploit will be IM-based. It is assumed that IM exploit could spread to half a million computers in just 30 seconds. One implication is that "signature based" techniques cannot prevent the initial outbreak; a "behavior based" approach is needed.

Stealth worms, or slow-spreading worms, are worms that make infection attempts at a rate significantly below the rate of the normal traffic. Also, worms that escape notice without being specifically designed to do so are sometimes also described as stealth viruses/worms. A stealth worm has various mechanisms designed to avoid detection by antivirus software. Typically, when an antivirus software runs, the stealth worm hides itself in the memory, and uses various tricks to also hide changes it has made to any host software and data. For example, a stealth worm may maintain a copy of the original, uninfected data in a certain area of the host memory and monitor the host activity. When the antivirus software attempts to find if data has been altered, the worm redirects it to the storage area that maintains the original, uninfected data, so that the antivirus software is tricked into believing that the host is healthy.

While the techniques used by the stealth worms limit the infection rate, these worms merely require a little more time to achieve the same growth as the fast worms, while being significantly harder to catch as they blend in with the normal traffic. The purpose of worms is also changing: with the new emphasis on crime and monetary profits, stealth worms are being used to target particular companies or customer to steal passwords, credit card information and so on. This means that many stealth worms are designed to stay-under-the-radar by purposely not infecting many machines so as to remain undetected. The implication is that stealth worms have a very different behavior than the flash worms and require different detection techniques.

Ideally, a network operator strives to identify fast an infected machine and quarantine it as soon as possible; otherwise, the infection could well spread before any alarm is raised. However, the price to pay for detecting and preventing security attacks is overwhelming. Today, enterprises deploy a layered defense model, which includes firewalls, anti-virus systems, access management and intrusion detections systems (IDS). Besides being expensive, responsiveness of these defense systems is impacted by the fact that the current solutions are based on multiple components, which may have problems to communicate and coordinate the required counter-measures.

A methodology for detection of Internet worms is presented in the article "The Monitoring and Early Detection of Internet Worms" (Zou et al.), August 2004. The system proposed in this article uses a Kalman filter to estimate traffic parameters in a known epidemic model. The problem with this approach is twofold: first, the Kalman filters are difficult to implement, and second, assuming that a worm spreads according to a specific class of epidemic models is dangerous, as the malware could be coded in a way so as to avoid this type of behavior.

Most research on worm detection has focused so far on catching fast spreading worms. For example, the co-pending patent application Ser. No. 11/450,348 entitled: "Method for Estimating the Fan-In and/or Fan-Out of a Node" (Rabinovitch), filed on 12 Jun. 2006 and assigned to Alcatel describes a method for detecting anomalies in traffic patterns and a traffic anomalies detector are presented. The method and the detector are based on estimating the fan-in of a node, i.e. the number of distinct sources sending traffic to a node, based on infrequent, periodic sampling. Destinations with an abnormally large fan-in are likely to be the target of an attack, or to be downloading large amounts of material with a P2P application. The method and the anomalies detector are extremely simple to implement and exhibit excellent performance on real network traces.

Co-pending patent application Ser. No. 11/656,434 (Chow et al.) fully identified above describes a malware detection and response system based on traffic pattern anomalies detection, whereby packets on each port of a network element (NE) are counted distinctly over a selected period of time, according to their transmission protocol and traffic direction. An attack is declared when an individual count or combination of counts exceeds a threshold. The system can be incorporated into the fast path, that is, the data plane, enabling communications systems such as switches, routers, and DSLAMs to have built-in security at a very low cost.

However, as discussed above, detecting a worm that scans fast has its own set of techniques, which cannot apply to slow worms. Little work (if any) has been done on detecting worms that spread at a rate that is so slow that they can not be detected by the above mentioned types of methods. The above described malware detection method will not notice anything unusual in case of worms that only attempt a single probe in each time window, or even a single probe in many time windows.

SUMMARY OF THE INVENTION

It is an object of the invention to provide a system for detecting propagation of stealth worms.

Accordingly, the invention provides a system for detecting stealth worms at an egress port of a network element (NE) connected in a data network, comprising: a header data processing unit for extracting address data from the header of the PDU; means for establishing a time window; means for storing a benchmark plot $A_k(k)$, where $A_k$ is an expected number, and k takes values between 1 and N; means for determining for the source NE, a set of destination NEs to which the source NE has sent PDUs during a current time window; means for determining for each of N successive time windows a current number $X_k$, which provides the total number of destination NEs in the data network to which the source NE sent PDUs during k successive time windows; and means for identifying a stealth worm attack when the current number $X_k$ is significantly different from the expected number $A_k$ on the benchmark plot.

The invention also provides a method for detecting stealth worms at an egress port of a network element (NE) connected in a data network, comprising the steps of: a) examining header data of each PDU seen on the port for identifying address data for the PDU; b) storing a benchmark $A_k(k)$ plot providing the expected number of destination NEs $A_k$ in the data network to which a source NE sends PDUs; c) determining for the source NE, a set of destination NEs to which the source NE has sent PDUs during a current time window; d) determining for each of N successive time windows a current number $X_k$, which provides the total number of destination NEs in the data network to which the source NE sent PDUs during k successive time windows; and e) identifying a stealth worm attack when the current number $X_k$ is significantly different from the expected value $A_k$ on the benchmark plot.

Advantageously, the system of the invention is an inexpensive solution that is easy to install, resulting in a low-cost way of detecting stealth worm traffic while minimizing false positives generated by normal traffic. The invention can be implemented in a way that has minimal impact on the datapath of the router, and allows for tracking of sources that are likely to be spreading slow scanning worms.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

The invention is directed to a system for detecting propagation of stealthy, slow probing worms.

In this specification, units through which digital data are transmitted from one point to another over a communication path are referred to generically as Protocol Data Units (PDU's). This term includes data units formatted according to various transmission protocols; PDU's can be IP packets, TCP packets, frames, etc. The term "fan-out" is used for the outgoing PDU's. As well, the system of the invention can be installed in any area of the network, with an adequate sizing for the targeted equipment (i.e. more flows implies larger amount of memory, etc.)

The system of the invention collects for each source, during a predetermined time window (TW), a representation of the set of destinations to which that source has sent packets. While a complete list of the IP addresses of the destinations can be kept for each packet, such a list would consume system resources and as such it would not be scalable. A better way to keep such a list is to use a compact hash table representing the set of destinations, as described in the above-identified parent U.S. patent application Ser. No. 11/656,434. The hash table can then be used for estimating the fan-out of a node (i.e. the number of distinct sources sending traffic to a node), based on periodic sampling.

Figure 1:
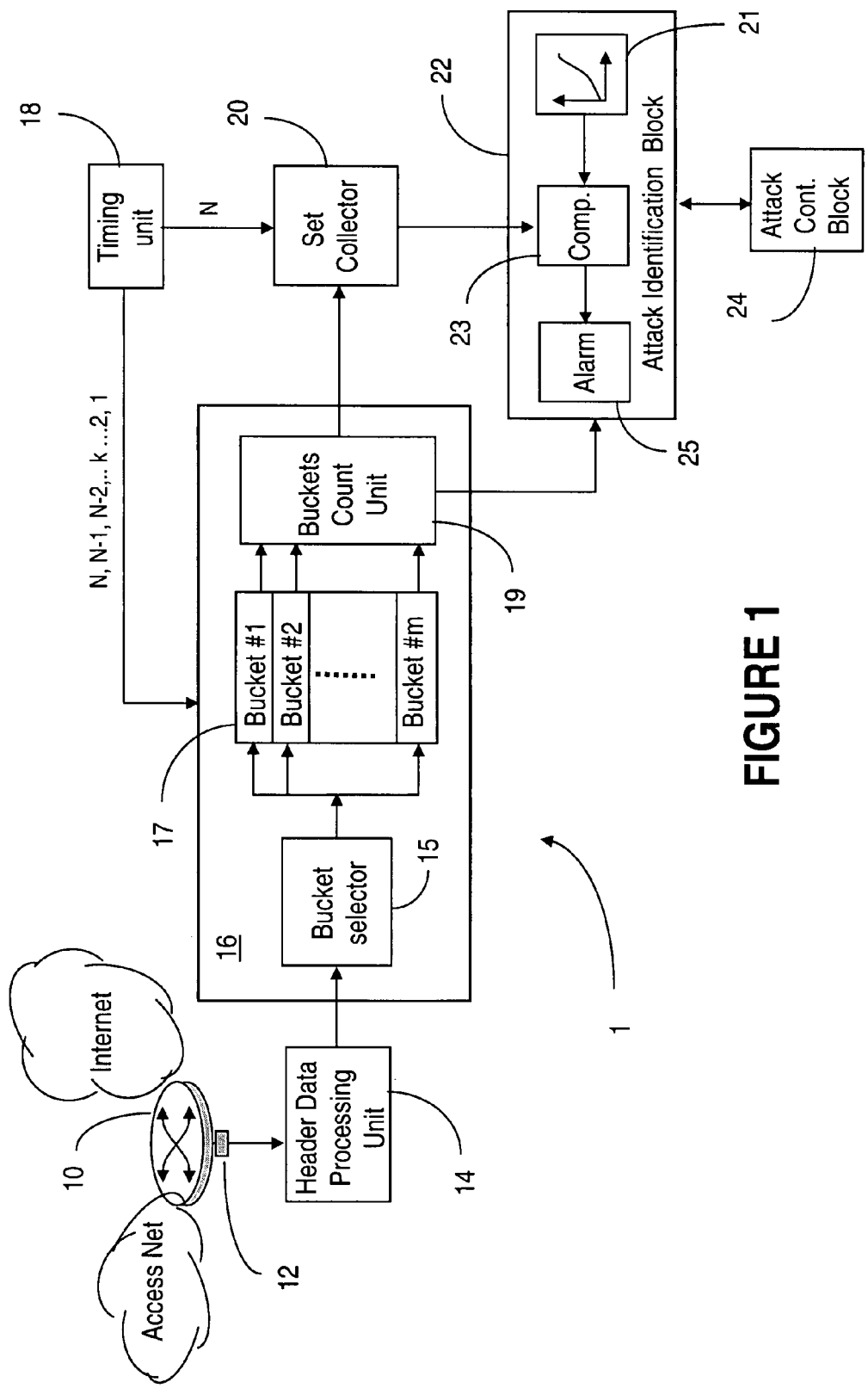
FIG. 1 illustrates the block diagram of an embodiment of the invention.

FIG. 1 shows the block diagram of a system 1 for worm detection by trending fan-out (WDTFO) according to an embodiment of the invention. This figure shows generically a network element (NE) 10 with a port 12; the WDTFO system 1 monitors the PDU's leaving port 12. The monitoring may be performed on selected ports or on all ports of a NE; FIG. 1 shows only port 12 by way of example. In this embodiment, system 1 includes a header data processing unit 14, a hash table unit 16, a set collector unit 20, an attack identification unit 22 and a timing unit 18. The system may also include an attack containment block 24.

Header data processing unit 14 monitors the PDU's seen on the port 12 and examines the data in various fields of the PDU's header with a view to determine the PDU "type" and to identify the source node, with a view to establish which hash table unit 16 should be updated. The header data processing unit 14 also extracts the IP addresses of the far-end hosts (addresses of the destinations for packets transmitted by a respective source), or IP address-port combinations. The technique used for determining the type of PDU's on port 12 and for extracting the source and destination address data from the header is beyond the scope of this invention. It is to be understood that any method for uncovering this information may be used as long as unit 14 does not impact operation of the datapath. The data extracted by the header data processing unit is referred generically as the "address data". The source address (and packet type, etc) is used to identify the appropriate hash table 16, and the destination data is used as seen later, for determining the number of far end hosts.

To detect and protect a system against slow probing worms, a time window (TW) is selected, as shown by timing unit 18. The duration of the time window is also a design parameter, and can be selected according to the needs of the network operator. A shorter time window will allow for a quicker detection of any anomaly, but it will consume more resources and results will have less confidence. A longer time window will provide more accurate information, at a slower rate. The default for the TW parameter is expected to be in the range of a few minutes.

Hash table unit 16 is used for identifying the far-end hosts (also referred to as destination NEs) to which the respective source sends packets in each time window. While FIG. 1 illustrates a hash table unit 16, system 1 may use multiple hash table units 16. The number of units 16 is a design parameter, depending on the number of source nodes that the provider wishes to monitor, the types of the traffic to be monitored, the direction of transmission, etc. For example, port 12 may be equipped with a hash table unit 16 for each direction of traffic, and each protocol type. It is to be noted that while it is desirable to maintain distinct hash table units 16 of far-end hosts for each of the PDU categories (types) listed above, it is also possible to combine hash table units for selected protocols. There is a lot of value even in the extreme case of using only a single hash table unit for all incoming and outgoing packets.

As discussed above, each port or only some ports of interest may be equipped with the system 1 of the invention. An advantage of this invention is that it is not necessary to synchronize the polling for all ports of the network element; spreading out the polling does not impact negatively on worm detection. Depending on the platform, one easy way is to integrate the pooling of the counters with SNMP polls, which means checking the counters of a port as the SNMP packets for that port are processed. Also, realistically, there is no need for high precision in the polling interval so it can be done as a low priority task.

Obviously, the usual methods of keeping track of destination nodes would run into CPU and memory limitations. Use of the hash table unit 16 results in a much faster way of counting the destination hosts seen on port 12 than keeping address lists, saves processor cycles and savers memory space at the expense of accuracy. Hash table unit 16 comprises a plurality of buckets 17, a bucket selector 15 and a buckets count unit 19. The number of buckets 17 used by unit 16 is a design parameter and is selected based on the intended scope of worm detection at that particular node and port, precision of attack detection required, resources available at the respective node/port, cost, etc. Preferably, the buckets 17 are provided in the form of a memory array of a selected size.

The idea is to hash the address data from the fields of the header that identify the destination host, as generically shown by bucket selector 15. We refer in the following to the data that is hashed by the bucket selector 15 as "the destination address". As an example, in case of IP packets, the bits that are hashed are the IP destination address bits of the packet, or the IP destination address and port number bits.

A hash value is obtained by applying the hash function to bits in the respective header fields. The hash value is then used as an index into array 17, for setting the bucket (bit) corresponding to the respective hash value. In this way, each bucket is associated with a certain set of destination host addresses, because the hash function performed over the bits in the same header fields is the same if the bits are the same. Buckets count unit 19 determines which and how many buckets are set in array 17. This set of buckets, denoted with X, indicates how many far-end hosts received/transmitted traffic during a time interval established by the current time window. As indicated above, TW is a design parameter, depending on the protocol of the PDUs monitored, desired accuracy of the result, etc. An attack may be for example detected if the number of far-end hosts is suspiciously high.

Each bucket could be set repeatedly (once for each applicable PDU) or it could be set only once during the time window, using a very simple algorithm. If bucket selector 15 determines a hash value that identifies one of the buckets Bucket#1 to Bucket#m, let's say, a Bucket#i, and that bucket has already been seen (set), nothing happens. If, on the other hand, if Bucket#i has not been set yet, it is set. The pseudo code for bucket updating is:

```
Declare seen as Boolean[m];      set m buckets
Bucket = hash (IP, port);        hash header data to find bucket number
If (seen[bucket]);               bucket already seen, do nothing
else;                            bucket not seen yet
   count = count + 1;
   seen[bucket]= true;
endif
```

In one experimental embodiment of the invention the buckets were implemented on a bit array of 256 bits (m=256) and the hash function selected reduced this number to 8 bits. Since the IP address space is 32 bits, for an 8-bit hash, there is a choice of $2^{24}$ combinations in the same bucket. In other words, $2^{24}$ different addresses data may set the same bucket. This means that an attacker could attempt to avoid detection by talking to hosts/ports that fall into the same bucket in order to keep the number of far-end hosts low.

Certain countermeasures may be used with a view to address this situation. For example, the hash function used by the bucket selector 15 may be designed so that addresses in the same subnet are likely to use different buckets (this is the "randomize" property that is expected from hash functions). XOR-ing the four address bytes together is another way to differentiate the sub-networks. Or, it is possible to XOR the last byte of the IP address and the lower byte of the port number; this will ensure that neither horizontal scanning (same port number, different IP address) nor vertical scanning (same IP address, different port) will end up in the same bucket. Still another solution is to add a randomizer to the hash function. Thus, a random 32 bit number may be picked at boot time, and added to the IP address before doing the XOR. This preserves the sub-net scattering property above and is difficult for the attacker to stay in the same bucket. In general, selection of the function depends on the complexity of the attack detection desired. All these methods are described and shown in further detail in the above-identified parent patent application.

A "linear counting" function is preferably used for hashing the address data, as described by K-Y Whang et al. in the paper "A Linear-Time Probabilistic Counting Algorithm for Database Applications", which presents a thorough mathematical treatment of these counting techniques. This type of function has been selected because it is the most accurate of the whole family of probabilistic counting techniques. Whang et al. derive the best estimate of the actual linear count:

$$\hat{n} = -m^* \ln(z/m)$$

where m is the array size, z is the number of unset entries in the array, and n is the real count.

Whang et al. also derive the error estimate for this type of function as:

$$StdErr(\hat{n}/n) = \frac{\sqrt{m(\exp(t) - t - 1)}}{n}$$

where t is a load factor determined by the n/m ratio.

The paper also gives guidelines for obtaining a desired accuracy. If we apply the finding of this paper to the system of the invention, it is noted that the size of array 17 may be reduced significantly from the 256 bits discussed above, without a significant impact on the accuracy of malware detection. A smaller array is desirable in order to make the implementation easier in software. For the system of the invention, if array 17 has four bytes (rather than a 256), the resulting accuracy is 17%. For a two byte array, the accuracy drops to 35%. This means even a very little memory space dedicated to the array still enables comprehensive results.

As indicated above, the hash table unit 16 does not distinguish between destinations that hash to the same bucket, so the statistics are not exact. While this is currently be the preferred implementation for counting the far-end hosts, any other scheme that provides such a set of destinations can be used as unit 16, thus allowing for tuning of accuracy vs. resource requirements, engineering costs, etc.

Figure 2:
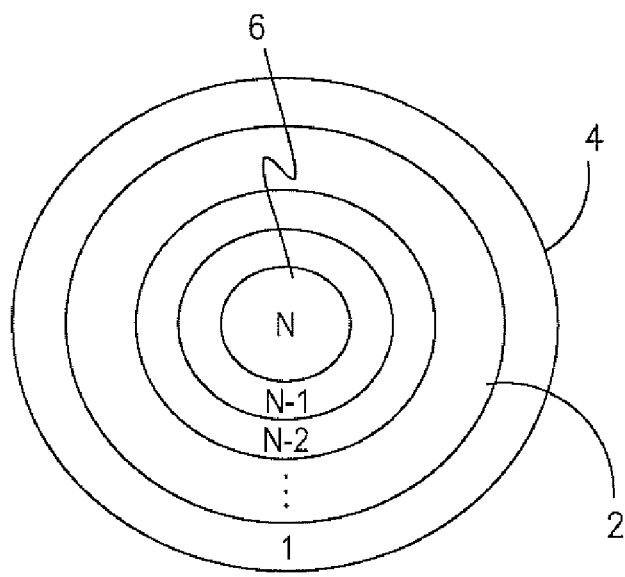
FIG. 2 shows an example of a collection of nested sets of destinations to which a source has sent packets, which destinations are common to N, N−1, . . . 1 time windows.

To reiterate, the number X provides the number of destination NEs to which a certain source NE has sent PDUs during the current time window, as determined by the number of buckets that have been set during that time window. The set collector 20 identifies the number of destination addresses that are common over successive sets of destination addresses, from the sets of destination addresses collected including the current set of destinations, X. This number is denoted with $X_k$. In other words, $X_k$ includes the number of destination NEs common to k sets collected over k successive time windows. Once N sets of destinations (for N successive time windows) have been obtained, the set collector determines the number of destinations that are common to all N, N−1, N−2, . . . , 2, 1 of these windows. The result is a collection of nested sets, with each destination address "seen" being in the ring labeling how many windows the destination address was seen in, as in FIG. 2. The term "seen" refers in this specification to the PDUs that are transmitted from port 12 to far-end hosts (outgoing PDU's).

Figure 3:
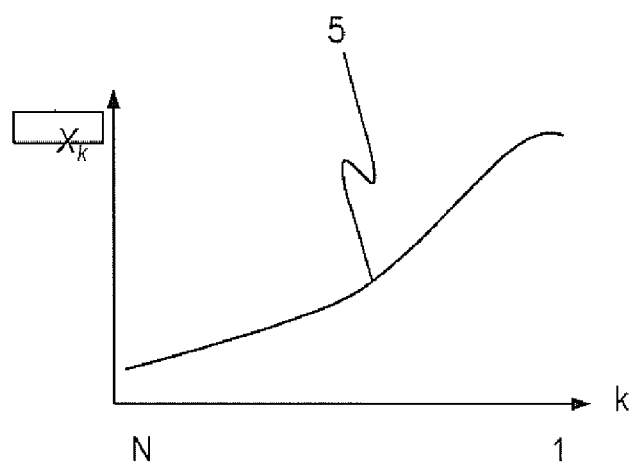
FIG. 3 is a graph illustrating the number of destinations that are common to N, N−1, . . . 1 windows versus the number of windows.

As seen in FIG. 1, the attack identification block 22 includes a memory 21 for storing a benchmark data set $A_k$, shown at 5 which is prepared for the respective source based on statistical data collected over time. The graph of data set $A_k$ plots the sets $A_k$ versus the respective number of time windows k; FIG. 3 shows the graph with the number of destinations for a particular source for k=1, 2, . . . , N time windows. Generally, $A_k$ should exhibit a stable behavior for each source. This enables modeling the sources by set collector unit 20 using a specific, appropriate distributional form, with a view to minimize the amount of storage required for each source. For example, a source may be modeled using a power law graph, etc.

Attack identification block 22 further includes a comparator 23 that compares the pooled set of destination $X_k$ collected by the set collector against the corresponding value $A_k$ in the data set. Values of $X_k$ that are significantly different from the modeled graph are declared to be suspicious by an alarm block 25. The term "significantly different" is a relative term with respect to the expected value $A_k$ in the data set, and is defined relatively to the respective benchmark plot. For example, a significantly different value may be considered an $X_k$ more than three standard deviations away from the mean value provided by plot 5 of the data set. Preferably, the anomalous values are also defined taking into account the time of day effects. Further analysis of such anomalous values may be performed by the attack identification block 22. Ideally, attack identification unit 23 should check plot 5 each time a counter is changed. While this mode of operation gives the fastest response time, it requires processing power in the data-path. Preferably, the checks are performed at each time window TW.

Once the type of attack has been identified, attack containment block 24 triggers a certain defensive action, based on rules provided in a rules set (not shown).

We claim:

1. A system for detecting stealth worms at a port of a network element (NE) connected in a data network, the system comprising:
   a header data processing unit that extracts destination address data from a header of a protocol data unit (PDU);
   a timing unit that establishes N non-overlapping timing windows $T_k$, where k is a value between 1 and N, for measurement of a plurality of N destination address sets $B_k$, wherein each destination address set $B_k$ comprises a set of Boolean values indicating whether a source NE sent PDUs to a destination NE within each timing window $T_k$;
   a memory unit that stores a pooled benchmark $A_k$ that provides a total number of expected destination NEs in the data network to which the source NE sends PDUs during each of k non-overlapping timing windows $T_k$;
   a set collector unit that determines, for each of N non-overlapping timing windows $T_k$, a pooled destination address $X_k$ based on the plurality of N destination address sets $B_k$ that provides a total number of destination NEs in the data network to which the source NE sent PDUs during each of the k non-overlapping timing windows $T_k$; and
   an attack identification unit that identifies a worm attack based on a comparison of a set of pooled destination addresses $X_k$ and a set of pooled benchmark addresses $A_k$.

2. The system of claim 1, further comprising:
   a hash table unit that determines, for the source NE, a destination NE set $B_k$ that indicates whether the source NE has sent PDUs to each destination NE during the timing window $T_k$.

3. The system of claim 2, wherein said hash table unit further comprises:
   a plurality of buckets, each of the plurality of buckets associated with a subset of destination NEs, that indicates whether a destination NE in the subset received PDUs from the port, wherein $B_k$ comprises a set of Boolean values indicating whether the source NE sent PDUs to a destination NE in the subset associated with the bucket.

4. The system of claim 2, further comprising:
a plurality of hash table units, wherein a number of hash table units is based at least on types of the PDUs leaving said port and numbers of source NEs that use the port.

5. The system of claim 3, wherein said hash table unit further comprises:
a bucket selector that identifies a bucket from the plurality of buckets that is associated with an address obtained from the address data and sets the Boolean value associated with the identified bucket to true; and
a bucket count unit that produces $B_k$ by identifying buckets set over the timing window $T_k$.

6. The system of claim 5, wherein the bucket is set only if the bucket has not been previously set during the timing window $T_k$.

7. The system of claim 1, wherein the attack identification unit further comprises:
a comparator that compares the set of pooled destination addresses $X_k$ with the set of pooled benchmark addresses $A_k$; and
an alarm that recognizes and declares the worm attack when the set of pooled destination addresses $X_k$ surpasses the set of pooled benchmark addresses $A_k$ by a predetermined amount for N non-overlapping timing windows $T_k$.

8. The system of claim 1, wherein the set of pooled benchmark addresses $A_k$ models an estimated standard behavior of the source NE over N non-overlapping timing windows $T_k$, based on a time and date.

9. The system of claim 4, wherein the attack identification unit compares the set of pooled destination addresses $X_k$ with the set of pooled benchmark addresses $A_k$ each time a bucket is set.

10. The system of claim 4, wherein the attack identification unit compares the set of pooled destination addresses $X_k$ with the set of pooled benchmark addresses $A_k$ only once in each of N timing windows $T_k$.

11. A method for detecting stealth worms at an egress port of a network element (NE) connected in a data network, the method comprising:
extracting destination address data from a header of a protocol data unit (PDU) seen on the egress port;
establishing N non-overlapping timing windows $T_k$, where k is a value between 1 and N, for measurement of a plurality of N destination address sets $B_k$, wherein each destination address set $B_k$ comprises a set of Boolean values indicating whether a source NE sent PDUs to a destination NE within the timing window $T_k$;
storing a pooled benchmark $A_k$ that provides a total number of expected destination NEs in the data network to which a source NE sends PDUs during each of k non-overlapping timing windows $T_k$;
determining, for each of N non-overlapping timing windows $T_k$, a pooled destination address $X_k$ based on the plurality of N destination address sets $B_k$ that provides a total number of destination NEs in the data network to which the source NE sent PDUs during each of the k non-overlapping timing windows $T_k$;
comparing a set of pooled destination addresses $X_k$ and a set of pooled benchmark addresses $A_k$; and
identifying a worm attack based on the results of the comparing step.

12. The method of claim 11, further comprising:
determining, by a hash table unit comprising a plurality of buckets, each of the plurality of buckets associated with a subset of destination NEs, a destination address set $B_k$ comprising a set of Boolean values that indicate whether the source NE has sent PDUs to a destination NE in the subset associated with the bucket during the timing window $T_k$.

13. The method of claim 12, further comprising:
identifying, based on destination address data, the bucket in the plurality of buckets associated with a subset of destination addresses including the destination NE in the network;
setting the Boolean value associated with the bucket to true;
identifying the Boolean value of the bucket B[k+1] in the timing window $T_k$; and
producing the destination address set $B_k$ for the timing window $T_k$.

14. The method as of claim 11, wherein the identifying step further comprises:
comparing the set of pooled destination addresses $X_k$ with the set of pooled benchmark addresses $A_k$; and
recognizing the worm attack when the set of pooled destination addresses $X_k$ surpasses the set of pooled benchmark addresses $A_k$ by a predetermined amount; and
declaring the worm attack when the set of pooled destination addresses $X_k$ surpasses the set of pooled benchmark addresses $A_k$ by the predetermined amount for N non-overlapping timing windows $T_k$.

15. The method of claim 14, wherein the predetermined amount is three times more than a standard deviation calculated for the set of pooled benchmark addresses $A_k$ for N non-overlapping timing windows $T_k$.

16. The method of claim 11, wherein the set of pooled benchmark addresses $A_k$ models an estimated standard behavior of the source NE over N non-overlapping timing windows $T_k$, based on the time and date.

17. The method of claim 11, wherein the identifying step further comprises:
adjusting the set of pooled destination addresses $X_k$ over N non-overlapping timing windows $T_k$ to account for time-of-day effects on the set of pooled destination addresses $X_k$.

18. The method of claim 17, wherein the identifying step further comprises:
comparing the set of pooled destination addresses $X_k$ with the set of pooled benchmark addresses $A_k$ each time a bucket of the plurality of buckets is set.

19. The method of claim 11, wherein the identifying step further comprises:
comparing the set of pooled destination addresses $X_k$ with the set of pooled benchmark addresses $A_k$ only once in each timing window $T_k$.

20. The method of claim 11, further comprising:
initiating a defense action for containing the worm attack.

* * * * *